Patented Oct. 9, 1934

1,976,302

UNITED STATES PATENT OFFICE 1,976,302

PHOTOTHERMOGRAPHIC COMPOSITION

Samuel E. Sheppard and Waldemar Vanselow, Rochester, N. Y., assignors to Eastman Kodak Company, Rochester, N. Y., a corporation of New York No Drawing. Application December 11, 1930, Serial No. 501,663

10 Claims. (Cl. 95—6)

This invention relates to photo sensitive compositions and photographic layers and their use for producing images in various photographic processes.

It has been found that the thermal decomposition of various substances is catalyzed by nuclei of one kind or another. We have found a method whereby these substances which may be decomposed by heat can be innoculated with nuclei by exposure to light, whereupon the thermal decomposition ensues more readily because of the presence of such nuclei. The action of heat upon such a substance may then be used as the basis of a process for the formation of an image, which may either be a visible image as ordinarily produced by photographic processes, a relief image, or an image which is distinguished from the background in that it differs in details of structure, such as granularity or surface texture.

Materials which are useful for our purpose are those substances which we describe as photothermographic. These substances are all affected by light. Under the action of light there are produced on the molecules or molecular aggregates nuclei of a new solid phase. The presence of these nuclei is, of course, not visible to the eye nor is it usually visible microscopically. Exposure below a certain value produces no visible effect. In some cases even prolonged exposure produces no visible image. On subsequent exposure to heat the thermal decomposition of the original solid is catalyzed by these nuclei. The decomposition will normally be initiated at the boundary of such a nucleus and the surrounding material constituting the molecule or molecular aggregate, and will rapidly proceed outward from this point. The product of this decomposition will usually be a new solid phase such as metal, metal oxide, metal sulfide, or the like, or it may be a gaseous or volatile substance, such as carbon dioxide, carbon monoxide, oxygen, or nitrogen, or products of both kinds. Photothermographic substances are therefore chemical compounds of a definite type in which thermal decomposition of the compound is catalyzed by previous illumination to light. It is understood, of course, that other forms of radiant energy than visible light may be used, such as ultra-violet radiation or X-rays.

Photothermographic substances having the properties just described will usually fall in the class of so-called heavy metal compounds, that is, salts and compounds of metals other than the alkali and alkaline earth metals. Salts which are particularly useful in the application of our invention will be those in which the anion is capable of decomposition to form one of the gases mentioned, such as carbon monoxide, carbon dioxide, oxygen, or nitrogen. Some of the metals whose salts are especially useful are silver, lead, mercury, and manganese. Useful salts are combinations of these metals with organic saturated di-basic acids such as oxalic, malonic, succinic, glutaric and adipic acid, all of which have less than 7 carbon atoms. Several tri-basic acids such as citric acid, may also be used. Besides these groups of acid compounds, a number of others are useful, such as silver formate, lead formate, lead thioacetate, and others.

We will now give several embodiments of our invention, which are given by way of example only.

Example I

An emulsion is made up to contain two grams of silver oxalate per 100 c. c. in gelatin. This emulsion will contain

|  | Part |
|---|---|
| Gelatin 15% aqueous solution | 1 |
| Potassium oxalate 3% aqueous solution | 1 |
| Silver nitrate 5.2% aqueous sol | 1 |

This emulsion is made by first adding the potassium oxalate to the gelatin solution and then adding the silver nitrate with constant mechanical stirring. After this gelatin-silver oxalate emulsion is prepared it is coated on a suitable support, chilled, dried, and preserved in the dark until ready for use. A very short exposure to ultra-violet light under a negative or positive produces a latent image which is developed out upon heating the plate to approximately 100° C. for about 5 minutes. The intensity of the image, of course, varies somewhat with the temperature and duration of the heat treatment. In this instance the image is a visible one.

Example II

An emulsion is made up to contain two grams of mercurous oxalate in 100 c. c. in gelatin. This emulsion contains

|  | Part |
|---|---|
| Gelatin 15% aqueous solution | 1 |
| Potassium oxalate 2.5% aqueous sol | 1 |
| Mercurous nitrate 6.5% aqueous solution containing about 7% conc. nitric acid | 1 |

This emulsion is made by adding the potassium oxalate solution to the gelatin solution and then adding the mercurous nitrate solution with vigorous mechanical stirring. The remainder of the treatment is the same as that given under Example I.

Example III

Silver oxalate is dried and produced in a very finely divided state. It is then dispersed in a medium such as a bakelite lacquer. A lacquer containing about 3% of silver oxalate will be satisfactory. This suspensoid can be coated up on a surface such as glass, polished metal, or other suitable support and allowed to dry. After a short exposure to light a slightly visible image can be further developed out by heat treatment.

The general method of making these coating solutions is similar to those given in the examples above. The metal salt is produced in the gelatin solution by adding the required acid to another soluble salt of a metal in solution in the gelatin. In this manner the photothermographic salt will remain in the layer either dissolved or suspended.

Among the carriers which may be used in this way are, besides gelatin and bakelite lacquer already mentioned, agar, casein, albumen, zein, drying oils, layers of regenerated cellulose, cellulose ethers, or cellulose esters, resins and siliceous enamel or glaze. In some cases the carrier is chosen to suit the intensity of the subsequent heat treatment required. Some of the salts mentioned as suitable, for instance, will require higher temperatures than others. Therefore, it will be necessary to choose a carrier and support which will not decompose nor be damaged by the treatment required. For example, gelatin coated on paper will be unsuited to the process if the temperature required will be as high as 150° C. or more, as the gelatin will tend to decompose and the paper will be damaged at temperatures much over this. Examples I and II will be satisfactory for use with gelatin on paper.

Our invention is useful either in the making of visible images, in the making of relief images, or in certain planographic processes in which an image differing from the background in surface texture will be of advantage. For obtaining a relief image, for example, it will be desirable to use a colloid carrier which swells readily, such as gelatin, and a photothermographic salt, such as an oxalate, which decomposes into gaseous products at a relatively low temperature. If a layer containing these constituents is carefully heated the points at which the light has acted will swell into relief.

Under certain conditions an image can be obtained which differs from the background principally in that it has a different structure or surface texture. Thus in some cases it will be found after heating that the image is distinguished from the background principally by having more granularity, or being more porous. This property may be of use in producing an ink or other transfer from such a surface to another support.

The invention may also be useful in ceramic decoration. For such use a coating consisting of a suitable lacquer and a photothermographic salt yielding after high temperature treatment a suitable color will be coated upon porcelain, glass, or pottery, for example, and then subjected to a high temperature to develop and burn it in. This application will, of course, be susceptible to wide variations.

Numerous other advantages and uses will be apparent.

We consider as included within our invention all variations and equivalents coming within the scope of the appended claims.

What we claim is:

1. The method of making a photographic image that comprises exposing to a light image a photosensitive layer comprising as its primary constituent a salt selected from the group consisting of the silver, lead, mercury, and manganous salts of organic saturated dibasic and tribasic acids, silver formate, lead formate and lead thioacetate, thereby forming a latent image therein and then submitting the layer to heat alone to develop a visible image therein.

2. The method of making a visible photographic image that comprises exposing to a light image a photosensitive layer comprising as its primary constituent an oxalate chosen from the following group, silver oxalate and mercurous oxalate, thereby forming a latent image, and then submitting the layer to heat alone to develop a visible image.

3. The method of making a photographic image that comprises exposing to a light image a photosensitive layer comprising mercurous oxalate and then heating the layer to develop an image therein.

4. The method of making a photographic image that comprises exposing to a light image a photosensitive layer comprising silver oxalate and then heating the layer to develop an image therein.

5. A photothermographic element comprising a support and a sensitive colloid layer thereon including as its primary photosensitive constituent a silver salt of an organic saturated dibasic acid of less than 7 carbon atoms, and free from added sensitizer.

6. A photothermographic element comprising a support and a sensitive colloid layer thereon including silver oxalate as its primary photosensitive constituent and free from added sensitizer.

7. A photothermographic element comprising a support and sensitive colloid layer thereon comprising as its primary constituent a salt selected from the group consisting of the silver, lead mercury and manganous salts of organic saturated dibasic and tribasic acids, silver formate, lead formate and lead thioacetate and free from added sensitizer.

8. The method of making a photographic image that comprises exposing to a light image a photosensitive layer comprising as its primary constituent a heavy metal salt of an organic saturated dibasic acid of less than seven carbon atoms and then heating the layer to develop an image therein.

9. A photothermographic element comprising a support, and a sensitive colloid layer thereon including as its primary photosensitive constituent a heavy metal salt of an organic saturated dibasic acid of less than 7 carbon atoms and free from added sensitizers.

10. A photothermographic element comprising a support and a sensitive colloid layer thereon including as its primary photosensitive constituent an oxalate of a heavy metal and free from added sensitizer.

SAMUEL E. SHEPPARD.
WALDEMAR VANSELOW.